(12) United States Patent
Johansson et al.

(10) Patent No.: US 12,264,050 B2
(45) Date of Patent: Apr. 1, 2025

(54) CARGO HANDLING VEHICLE FOR NAVIGATION IN NARROW AISLES AND METHOD THEREFORE

(71) Applicant: Kalmar Solutions AB, Kista (SE)

(72) Inventors: Per-Erik Johansson, Lidhult (SE); Hans Philip Zachau, Gothenburg (SE); Robert Bourghardt, Gothenburg (SE)

(73) Assignee: KALMAR SOLUTIONS AB, Kista (SE)

( * ) Notice: Subject to any disclaimer, the term of this patent is extended or adjusted under 35 U.S.C. 154(b) by 961 days.

(21) Appl. No.: 16/977,999

(22) PCT Filed: Mar. 5, 2019

(86) PCT No.: PCT/SE2019/050187
§ 371 (c)(1),
(2) Date: Sep. 3, 2020

(87) PCT Pub. No.: WO2019/172824
PCT Pub. Date: Sep. 12, 2019

(65) Prior Publication Data
US 2021/0039929 A1 Feb. 11, 2021

(30) Foreign Application Priority Data
Mar. 6, 2018 (SE) .................................... 1850243-5

(51) Int. Cl.
*B66F 9/06* (2006.01)
*B65G 1/04* (2006.01)
(Continued)

(52) U.S. Cl.
CPC ............ *B66F 9/063* (2013.01); *B65G 1/0492* (2013.01); *B65G 1/1371* (2013.01);
(Continued)

(58) Field of Classification Search
CPC ................ B65G 1/0492; B65G 1/1371; B65G 2201/0235; B66C 23/42; B66F 9/063;
(Continued)

(56) References Cited

U.S. PATENT DOCUMENTS 9,864,375 B1 * 1/2018 Kirkhope .................. E02F 9/00
2005/0133294 A1 6/2005 Jung
(Continued)

FOREIGN PATENT DOCUMENTS

CN 101893439 11/2010
CN 104803325 7/2015
(Continued)

OTHER PUBLICATIONS

Narrow; Oct. 12, 2017; dictionary.cambridge.org; pp. 1-4.*
Suitable; Feb. 20, 2018; dictionary.cambridge.org; pp. 1-2.*

*Primary Examiner* — Andrew R Dyer
(74) *Attorney, Agent, or Firm* — DUANE MORRIS LLP; Gregory M. Lefkowitz; Randall C. Pyles

(57) ABSTRACT

The invention relates to a cargo handling vehicle for handling cargo within narrow aisles. The cargo handling vehicle comprises means for autonomous navigation, a chassis having at least two pairs of ground engaging means, a lifting boom. The lifting boom having a first end and a second end wherein the first end is arranged to the chassis and the second end is provided with a lifting unit. The first end of the lifting boom is attached to the chassis enabling movement of the second end in a vertical and horizontal direction, and the lifting unit is arranged rotatably in a horizontal plane. Each of the ground engaging means are independently steerable and individually driven by a respective driving means. Further, the invention also relates to a method in a cargo handling vehicle.

19 Claims, 5 Drawing Sheets

(51) Int. Cl.
*B65G 1/137* (2006.01)
*B66F 9/065* (2006.01)
*B66F 9/075* (2006.01)
*G05D 1/00* (2006.01)

(52) U.S. Cl.
CPC .......... *B66F 9/0655* (2013.01); *B66F 9/0755* (2013.01); *B66F 9/07554* (2013.01); *B66F 9/07559* (2013.01); *G05D 1/0088* (2013.01); *B65G 2201/0235* (2013.01); *B66F 9/07568* (2013.01); *B66F 9/07572* (2013.01)

(58) Field of Classification Search
CPC .. B66F 9/0655; B66F 9/0755; B66F 9/07554; B66F 9/07559; B66F 9/07568; B66F 9/07572; B66F 9/186; G05D 1/0088; G05D 1/0212
USPC .......................................................... 701/25
See application file for complete search history.

(56) References Cited

U.S. PATENT DOCUMENTS

| | | | | |
|---|---|---|---|---|
| 2005/0183896 | A1* | 8/2005 | Fenelli | B66F 9/07577 180/65.265 |
| 2005/0284934 | A1* | 12/2005 | Ernesti | G06Q 10/087 235/385 |
| 2008/0038105 | A1* | 2/2008 | Weis | B66F 9/0655 414/561 |
| 2008/0087484 | A1* | 4/2008 | Fenelli | B66F 9/06 180/413 |
| 2011/0160964 | A1* | 6/2011 | Obradovich | H04L 43/08 701/41 |
| 2012/0123614 | A1* | 5/2012 | Laws | G05B 19/4189 701/2 |
| 2012/0201639 | A1 | 8/2012 | Turrini | |
| 2014/0039676 | A1* | 2/2014 | Fernando | G05D 1/0214 901/1 |
| 2014/0076643 | A1 | 3/2014 | Osswald | |
| 2015/0019064 | A1* | 1/2015 | Shin | B60W 30/095 701/25 |
| 2016/0107838 | A1* | 4/2016 | Swinkels | B65G 1/1373 414/273 |
| 2017/0036859 | A1* | 2/2017 | Lopes Ribeiro | B65G 1/137 |
| 2017/0107055 | A1* | 4/2017 | Magens | B66F 9/12 |
| 2018/0038082 | A1* | 2/2018 | Hashimoto | E02F 3/7609 |
| 2018/0057049 | A1* | 3/2018 | Stewart | B66F 9/07568 |
| 2018/0059682 | A1* | 3/2018 | Thode | B60W 40/105 |
| 2018/0089616 | A1* | 3/2018 | Jacobus | G06K 19/07758 |
| 2018/0127211 | A1* | 5/2018 | Jarvis | B65G 1/1373 |
| 2018/0127212 | A1* | 5/2018 | Jarvis | B65G 1/1375 |
| 2019/0031202 | A1* | 1/2019 | Takeda | B60T 8/17557 |
| 2019/0187709 | A1* | 6/2019 | Sunil Kumar | B60W 30/09 |
| 2019/0271990 | A1* | 9/2019 | Grabbe | G05D 1/0297 |
| 2019/0333012 | A1* | 10/2019 | Jacobus | B66F 9/063 |

FOREIGN PATENT DOCUMENTS

| | | | | |
|---|---|---|---|---|
| CN | 104828712 | | 8/2015 | |
| CN | 106044034 | | 10/2016 | |
| CN | 206783251 | | 12/2017 | |
| DE | 102004041938 | | 3/2006 | |
| DE | 102012015217 | | 2/2014 | |
| EP | 0876292 | | 11/1998 | |
| EP | 0876292 | B1 * | 6/2000 | ............ B66F 9/0655 |
| GB | 2264689 | | 9/1993 | |
| JP | 2016204068 | | 12/2016 | |
| WO | 0114239 | | 3/2001 | |

* cited by examiner

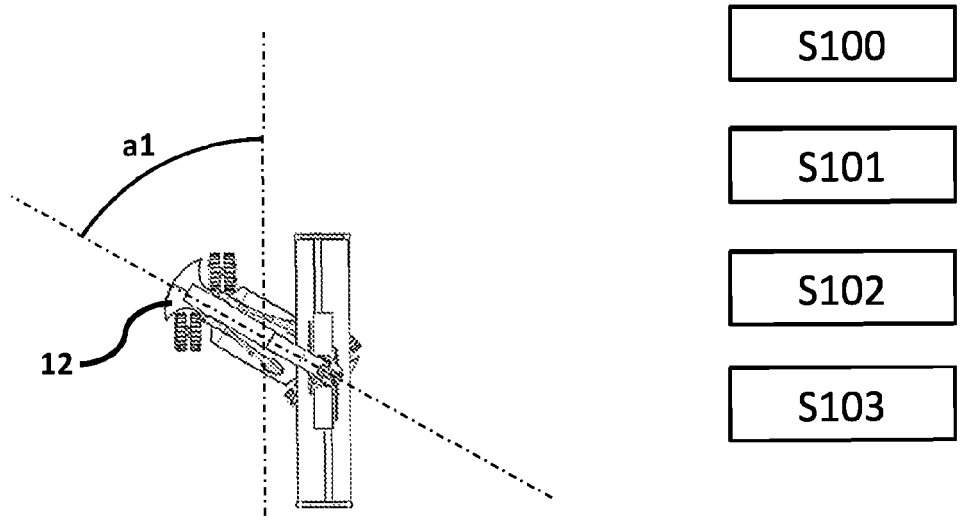
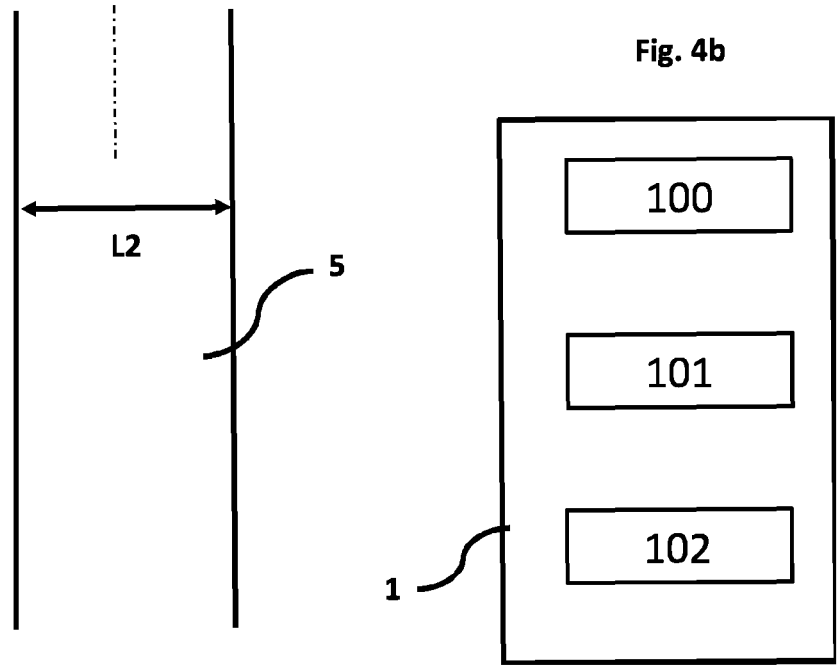
Fig. 4a
Fig. 4b
Fig. 4c

CARGO HANDLING VEHICLE FOR NAVIGATION IN NARROW AISLES AND METHOD THEREFORE

CROSS-REFERENCE TO RELATED APPLICATIONS

This application is a § 371 national stage entry of International Application No. PCT/SE2019/050187, filed Mar. 5 2019, which claims priority of Sweden National Application No. 1850243-5, filed Mar. 6, 2018, the entire contents of which are incorporated herein by reference.

TECHNICAL FIELD

The present invention relates generally to a cargo handling vehicle for handling cargo within narrow aisles, a method in a cargo handling vehicle, and navigation means therefor.

BACKGROUND ART

As in many fields of activity, there is an increased demand of profitability and desire to use resources, such a ground area, efficiently. In e.g. port areas the available ground area is a limitation to the storage capacity of the port. Therefore, the used ground area is one of the cost units which influences the profitability within the port. Thus, there is a desire to use the ground area more wisely and efficient.

In prior art is known conventional cargo handling vehicles which handles cargo loads such as freight containers with a length between for example 20 and 50 foot. The conventional cargo handling vehicles are controlled by an operator located within a driving compartment of the cargo handling vehicle. Preferably, the prior art cargo handling vehicle is provided with a front pair of wheels and a rear pair of wheels.

To be able to handle a cargo load such as a freight container, i.e. lift and place on top of other stacked freight containers or pick up and transport to another desired area, the prior art cargo handling vehicle needs an aisle in front of the stacked freight containers with a width which allows the cargo handling vehicle to drive straight back and forth, i.e. in a perpendicular direction, towards the stacked freight containers, at least within a short distance in front of the stacked containers. The desired width of the aisles in between the stacked freight containers gives rise to unused ground area, when seen from a perspective relating to an efficient storage area for freight containers. Thus, the larger aisle width between the stored and stacked freight containers, the fewer freight containers are possible to store in an assigned ground area.

SUMMARY OF INVENTION

An object of the present invention is to provide a cargo handling vehicle and a method in a cargo handling vehicle by means of which the required aisle width between stacked freight containers and/or cargo units can be decreased. In other words, the object of the invention is to increase the density of freight containers per square meter.

Another object of the present invention is to increase the flexibility of how a cargo handling vehicle moves within an aisle.

Thus, the solution relates to a cargo handling vehicle for handling cargo within narrow aisles wherein the cargo handling vehicle comprising means for autonomous navigation, a chassis having at least two pairs of ground engaging means, a lifting boom provided on the chassis extending in the extension direction of said chassis. The lifting boom having a first end and a second end wherein the first end is arranged to the chassis and the second end is provided with a lifting unit. The first end of the lifting boom is attached to the chassis enabling movement of the second end in a vertical and horizontal direction. The lifting unit is arranged rotatably in a horizontal plane, and each of the ground engaging means are independently steerable. Each of the ground engaging means is also individually driven by a respective driving means.

According to one embodiment the cargo handling vehicle is a variable-reach container handler or, as it also is called, a reach stacker.

According to one embodiment the cargo handling vehicle further comprises sensor means for determining the width of a narrow aisle.

According to one embodiment the means for autonomous navigation of the cargo handling vehicle determines a travel angle for the cargo handling vehicle based on the determined width of the narrow aisle.

It is one advantage with the present solution that the travel angle can be determined to minimize the width required for the cargo handling vehicle to travel through a narrow aisle.

According to one embodiment the means for autonomous navigation of the cargo handling vehicle determines a lifting unit angle based on the determined width of the narrow aisle.

It is one advantage with the present solution that the lifting unit angle can be determined to minimize the width required for the cargo handling vehicle to travel through a narrow aisle.

According to one embodiment the autonomous navigation means further use any one or more of the width, length, or weight of a freight container to determine at least one of the travel angle or lifting unit angle.

It is one advantage that the autonomous navigation means can take other parameters than solely the width of the narrow aisle into consideration when determining a suitable travel and/or lifting unit angle. Thus, the stability may be enhanced and/or optimized.

According to one embodiment the chassis have a rear end and a front end, the front end is provided with a front pair of the ground engaging means and the rear end is provided with a rear pair of ground engaging means.

According to one embodiment at least one pair of the ground engaging means is arranged adjustable along the length of the cargo handling vehicle such that the length of the wheel base can be altered.

According to one embodiment the chassis is provided with a counter weight which is movable in a longitudinal direction of the chassis.

It is one advantage that the counter weight in combination with the travel angle and lifting unit angle can be used to enhance the stability of the cargo handling vehicle.

According to one embodiment the cargo lifting unit can pivot around three different axial directions.

It is one advantage with the present solution that the cargo lifting unit can pivot around three different axial directions providing six degrees of freedom.

According to one embodiment the cargo lifting unit can pivot in at least four degrees of freedom.

According to one embodiment the cargo lifting unit can pivot in six degrees of freedom.

According to one embodiment the control means are adapted to at least partially make the cargo handling vehicle autonomous and is adapted to steer and drive the ground engaging means as well as controlling the telescopic lifting boom.

According to one embodiment the control means for autonomous navigation further is adapted to determine a travel angle and a lifting unit angle.

According to one embodiment the travel angle is the angle in relation to the extension direction of the narrow aisle that the cargo handling vehicle enters the narrow aisle with.

According to one embodiment the lifting unit angle is the angle between the extension direction of the chassis and/or the extension direction of the lifting boom and the extension direction of the lifting unit and/or the extension direction of the freight container.

According to one embodiment the driving means is an electric motor that can be actuated in two directions.

According to one embodiment each of the ground engaging means can pivot around a vertical axis. Each of the ground engaging means might for example be one or multiple wheels or tracks arranged together.

According to one embodiment the ground engaging means can pivot ±90 degrees around the vertical axis.

According to one embodiment the ground engaging means can pivot ±180 degrees around the vertical axis.

According to one embodiment the ground engaging means is one or multiple wheels.

According to one aspect a method in a cargo handling vehicle is provided wherein the cargo handling vehicle comprises means for autonomous navigation within narrow aisles. The cargo handling vehicle further comprises a chassis having at least two pairs of ground engaging means, a lifting boom provided on the chassis extending in the extension direction of said chassis. The lifting boom having a first end and a second end wherein the first end is arranged attached to the chassis and the second end is provided with a lifting unit. The means for autonomous navigation performs the steps:
receiving a request for handling a freight container within a narrow aisle, wherein the request comprises a container ID, a size of the freight container, and a position of the freight container,
determining the width of the narrow aisle,
based on the size of the freight container, the width of the narrow aisle, and a known length of the cargo handling vehicle determining a suitable travel angle for the cargo handling vehicle within the narrow aisle.

According to one embodiment the means for autonomous navigation further performs the step:
based on the size of the freight container, the width of the narrow aisle, and a known length of the cargo handling vehicle determining a suitable lifting unit angle for the freight container within the narrow aisle.

According to one embodiment the size of the freight container is any one of the length, width, height, and weight of the freight container.

According to one embodiment the method further comprises aligning the cargo handling vehicle to the travel angle.

According to one embodiment the method further comprises aligning the lifting unit to the lifting unit angle.

According to one embodiment the width of the narrow aisle is determined by a sensor means arranged on said cargo handling vehicle.

According to one embodiment the cargo handling vehicle steer each of the ground engaging means independently aligning the cargo handling vehicle in relation to the narrow isle to the suitable travel angle, and drives each driving means individually.

BRIEF DESCRIPTION OF DRAWINGS

The invention is now described, by way of example, with reference to the accompanying drawings, in which:
FIG. 4a shows a top view of the cargo handling vehicle,
FIG. 4b shows a block diagram relating to a method in a cargo handling vehicle,
FIG. 4c shows a block diagram of a cargo handling vehicle comprising means for autonomous navigation and means for manual handling of the cargo handling vehicle.

DESCRIPTION OF EMBODIMENTS

In the description below, various directions will be given with reference to a cargo handling vehicle oriented in a forward driving direction. Example of such directions can be forward, rear, up, down etc. It should particularly be pointed out that the directions for the cargo handling vehicle are given with reference to a vehicle placed on a ground surface in a driving ready condition.

Figure 1A:
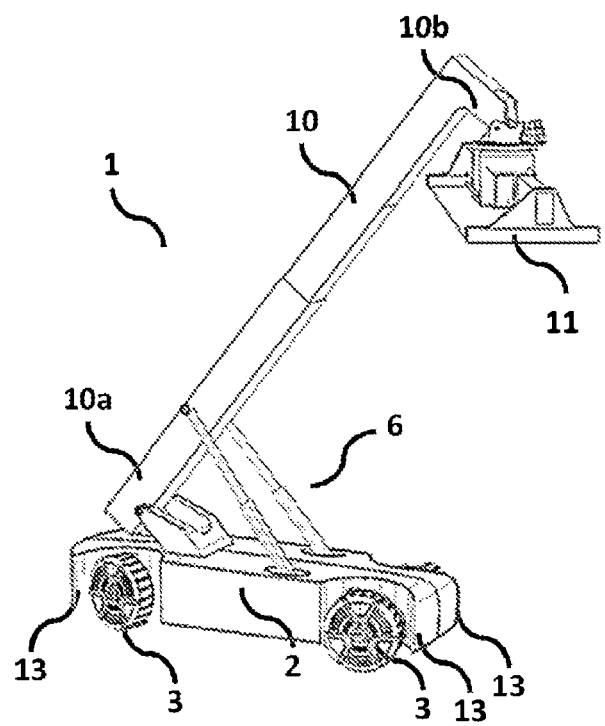
FIG. 1a shows an isometric view of a cargo handling vehicle according to the invention.

In the following, a detailed description of the cargo handling vehicle according to the invention is given. FIGS. 1-5b shows different views of the cargo handling vehicle according to the invention. In FIG. 1 the cargo handling vehicle 1 for handling cargo within narrow aisles 5 is disclosed. The cargo handling vehicle can for example be a reach stacker, freight container handling vehicle, variable-reach container handler or any other similar vehicle which handles cargo. The variable-reach container handler is sometimes referred to as a reach stacker. In this context, the expression cargo is to be interpreted as cargo which is enclosed by any type of frame work such as for example a freight container. The cargo which is handled by the cargo handling vehicle has a length L4. The cargo can for example be a freight container 4 with a length L5 which for example may be 20 feet, 40 feet, or any other suitable container length.

The cargo handling vehicle 1 comprises a chassis 2. The chassis is in one embodiment as illustrated in for example FIG. 1a a rigid chassis manufactured in one piece. The chassis can in other embodiments have different form or shape, such as made from beams or any other conventional method of manufacturing a chassis. The chassis 2 having at least two pairs of ground engaging means 3, a lifting boom 10 provided on the chassis 2. By means of the ground engaging means, the cargo handling vehicle can be driven over a ground surface. The ground engaging means can be any means which allows the cargo handling vehicle to drive on and over a ground surface. Examples of ground engaging means 3 can be wheels, omni wheels, crawlers etc. The at least two pairs of ground engaging means 3 is not limited to a specific number of ground engaging means on each axis, for example two pairs of ground engaging means 3 may be two wheels on a front axis and two wheels on a rear axis, four wheels on a front axis and four wheels on a rear axis, or any other suitable combination of ground engaging means 3. In one embodiment the ground engaging means 3 are other means than wheels, such as continuous tracks or other ground engaging means 3.

The lifting boom 10 extend in the extension direction of the chassis 2 and is attached to the chassis 2 within a rear area of the chassis. The chassis is elongated with a front end and a rear end. The front end of the chassis is provided with a front pair of ground engaging means 3 and the rear end is provided with a rear pair of ground engaging means 3. Each pair of ground engaging means 3 comprises a ground engaging means provided on either side of the chassis 2.

The lifting boom 10 comprises a first end 10a and a second end 10b. The first end 10a is provided on the chassis 2 and the second end 10b is provided with a lifting unit 11. In this context the expression lifting unit is to be interpreted as a unit onto which the cargo is detachably attached during transport and handling. The lifting unit 11 is for example illustrated in FIG. 1a and FIG. 1b. Another term for the lifting unit can be spreader, attachment, or tophandler.

Figure 2:
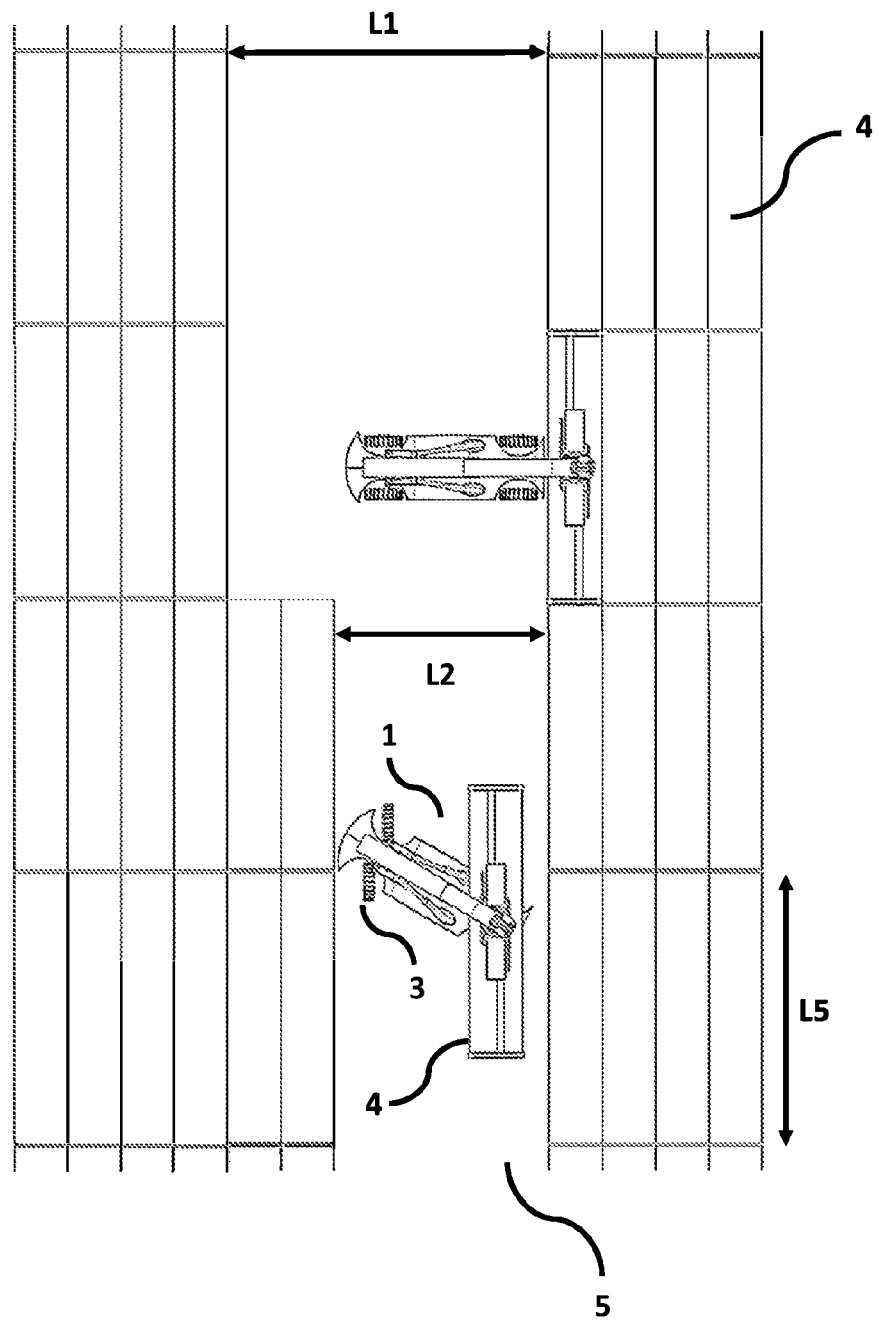
FIG. 2 shows a top view of the cargo handling vehicle positioned in an aisle between multiple stacked containers.

The first end 10a of the lifting boom 10 is attached to the chassis 2 enabling movement of the second end 10b in a vertical and horizontal direction. The first end 10a of the lifting boom 10 is arranged in connection to the rear end of the chassis. The movement in the vertical and horizontal direction of the lifting boom is made feasible by means of for example one or more hydraulic cylinders 6, which are driven by drive means. Each hydraulic cylinder 6 comprise a first end attached to the chassis and a second end attached to the lifting boom 10. It shall be noted that the hydraulic cylinder 6 might be any form of means adapted to lift the lifting boom without being outside the scope of the solution as described herein. For example, the lifting boom 10 might be lifted by electrical cylinders or pneumatic cylinders. Further, the lifting boom 10 is advantageously a telescopic lifting boom. The telescopic lifting boom makes it possible to lift and handle cargo arranged on top of other stacked freight containers. Further, the stacked freight containers can be stacked in multiple rows which are adjacent to each other, as is shown in FIG. 2. Thus, the telescopic lifting boom also facilitate to lift and hand freight containers arranged behind a first or second row of stacked freight containers.

Further, the lifting unit 11 is at least rotatably arranged in a horizontal plane, such that the cargo can be rotated in relation to the chassis and the lifting boom 10, for example when a cargo load is to be taken out from a stack of containers. A width L1; L2 of the aisle can be shorter than the length L4 of the chassis 2. The width L1, L2 of the aisle 5 can vary along the length of the aisle 5 between stacked containers, as shown in FIG. 2.

FIG. 2 further illustrates one of the advantages of the cargo handling vehicle as described herein. The normal aisle width L1 is significantly wider than the narrow aisle width L2.

The lifting unit 11 can be translated along at least three different directions of motion. The three directions of motions comprise a vertical direction, a first horizontal direction and a second horizontal direction. The first horizontal direction and the second horizontal direction is preferably arranged perpendicular to each other, and the vertical direction is perpendicular arranged in relation to a plane which is composed of the first horizontal direction and the second horizontal direction. Further, the lifting unit 11 can be rotated around at least one of the three directions of motion. Thus, the lifting unit can have at least four degrees of freedom. Preferably, the lifting unit can be translated along the three directions of motion and be rotated around the three directions of motion. With this configuration, the lifting unit comprises six degrees of freedom.

Each of the ground engaging means 3 is independently steerable and each of the ground engaging means 3 is individually driven by a respective driving means. The driving means is in one embodiment an electric motor but can also be other forms of propulsion units, such as a gasoline engine or similar. The electric motor can be actuated in two directions to be able to drive the ground engaging means such that the cargo handling vehicle can drive in a direction forward or a direction rearward. Each of the ground engaging means are arranged for individual steering, such as arranged to pivot around a vertical pivot axis. For example, describing a non-limited example of different positions of individual steering of the ground engaging means, In a first position the ground engaging means are aligned with the longitudinal direction of the chassis and in a second position the ground engaging means are transversally provided in relation to the longitudinal direction of the chassis. Thus, the ground engaging means can pivot ±90 degrees around the vertical axis between the first and second positions. In some embodiments the ground engaging means are adapted to pivot ±180 degrees.

Upon handling of a freight container, the chassis of the cargo handling vehicle can be steered and driven independently of the lifting unit. The lifting unit may translate the freight container in a direction which is transverse to the longitudinal direction of the chassis 2.

Figure 1B:
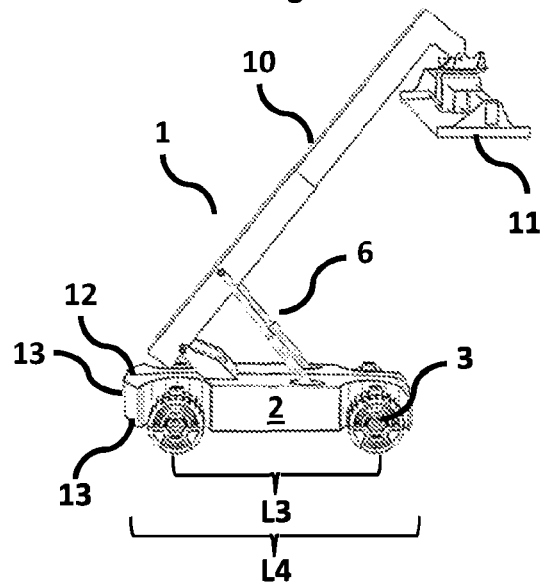
FIG. 1b shows a view of the cargo handling vehicle.

In FIG. 1b the length of the chassis is denoted L4 and a wheel base or a distance between the wheels are denoted L3. In one embodiment, at least one pair of the ground engaging means can be adjusted along the length of the cargo handling vehicle 1. Thus, the length L3 of the wheel base can be altered. Preferably, it is the rear pair of ground engaging means is adjustable along the length of the chassis, this to be able to move the center of gravity as far rearwards as possible to be able to compensate for the disequilibrium when heavy cargo is handled by the lifting unit 11. However, in some embodiments the front pair of ground engaging means are adjustable along the length of the chassis. Alteration of the length L3 can be one option to alter the center of gravity of the cargo handling vehicle during a lifting operation. In one embodiment, to alter the center of gravity the chassis is provided with a counterweight 12, which is movable in a longitudinal direction of the chassis.

Further, the cargo handling vehicle 1 comprises, means for autonomous navigation within narrow aisles 5. The control means is at least partially autonomous which can steer and drive the ground engaging means and the telescopic boom. The means for autonomous navigation comprises a sensor means 13 arranged on said cargo handling vehicle 1. The sensor means can be any of a radar means, camera means etc, adapted to determine the width of an aisle L1; L2.

Figure 3A:
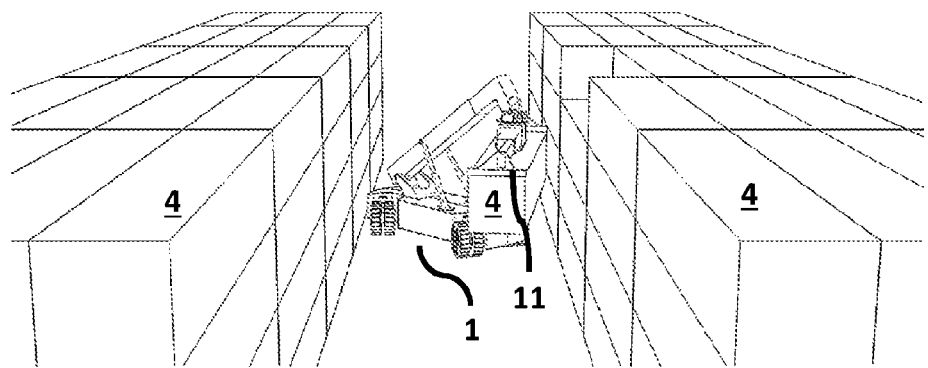
FIG. 3a shows an isometric view of the cargo handling vehicle.

FIG. 3a illustrates one embodiment wherein a cargo handling vehicle 1 handles a freight container 4. As shown in FIG. 3a the cargo handling vehicle is traveling at a traveling angle a1 within the narrow aisle and the freight container 4 is held at a lifting unit angle a2 by the lifting unit 11.

Figure 3B:
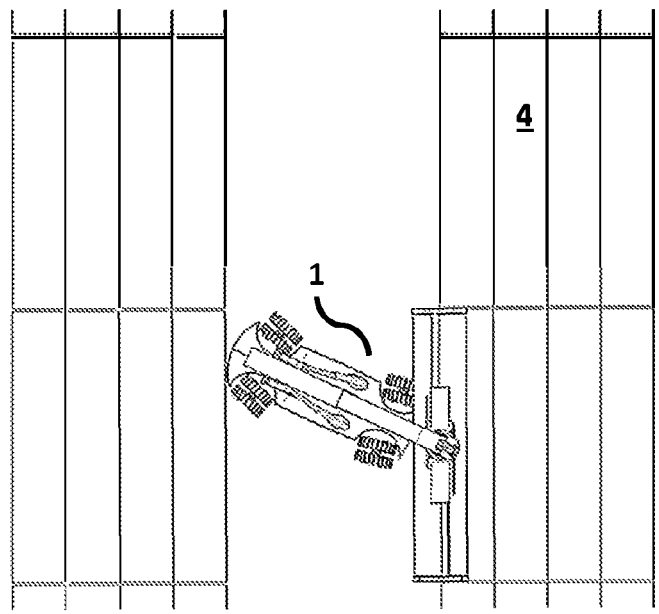
FIG. 3b shows a top view of the cargo handling vehicle.
Figure 5A:
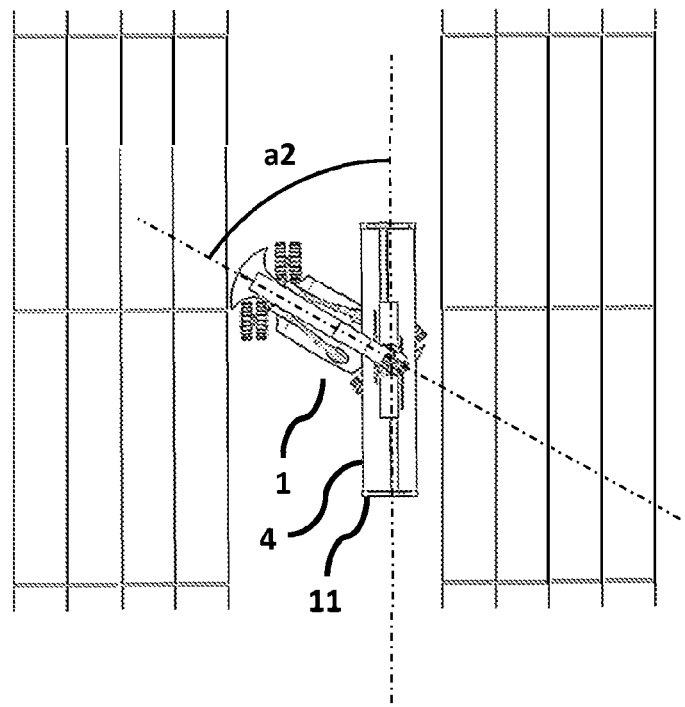
FIG. 5a shows a top view of the cargo handling vehicle.
Figure 5B:
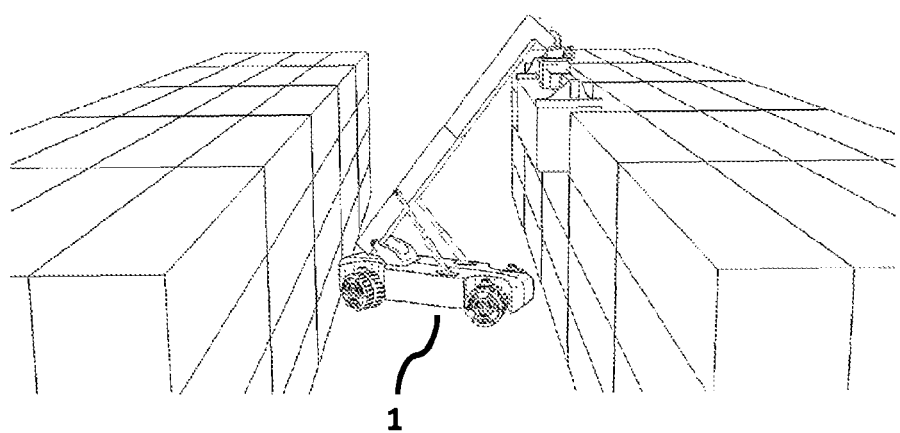
FIG. 5b shows an isometric view of a cargo handling vehicle.

FIG. 3b illustrates a top view of a similar embodiment as illustrated in FIG. 3a wherein the cargo handling vehicle 1 handles a freight container 4 in a stack of freight containers. In FIG. 5b a similar embodiment is illustrated in an isometric view.

During navigation within narrow aisles 5 between stacked cargo units, such as freight containers, the means for autonomous navigation performs a freight container handling method. The means for autonomous navigation receives a request in method step S100 for handling the freight container 4 within the narrow aisle 5. The request comprises information related to the freight container 4, such as a container ID, a size of the freight container, weight and a position of the freight container, this to be able to localize the container within the stack and prepare the cargo handling vehicle to handle the freight container. Further, the width L1; L2 of the narrow aisle 5 is determined by the means for autonomous navigation by means of the sensor means 13 in method step S101. In the case the width L1; L2 is varied along the length of the aisle, the information relating to the width is continuously updated during the navigation. By means of the information related to the size of the freight container, the width L2 of the narrow aisle, and a known length L3; L4 of the cargo handling vehicle 1, the means for autonomous navigation determines in method step S102, a suitable travel angle a1 for the cargo handling vehicle 1 within the narrow aisle 5. The suitable travel angle a1 is the angle between the travel direction for the cargo handling vehicle when driving in the aisle and the longitudinal axis of the chassis 2. A principal sketch of this is illustrated in FIG. 4a.

FIG. 4b illustrates a block diagram/flow chart of some method steps of one embodiment of the solution.

FIG. 4c shows a principal sketch of a cargo handling vehicle 1 comprising means for autonomous navigation 100 and means for manual handling 101. In one embodiment, as illustrated in FIG. 4c the cargo handling vehicle further comprises means for adjusting 102 an adjustable counter weight 12.

The means for autonomous navigation further determines in S103 a suitable lifting unit angle a2 for the freight container within the narrow aisle, which is based on the size of the freight container, the width L2 of the narrow aisle, and a known length L3; L4 of the cargo handling vehicle 1. A principal sketch of this is illustrated in FIG. 5a. Further, the size of the freight container is any one of the length, width, height, and weight of the freight container 4. The suitable lifting unit angle a2 is the angle between the longitudinal direction of the freight container and the longitudinal axis of the chassis 2.

The width L2 of the narrow aisle 5 is determined by a sensor means 13 arranged on said cargo handling vehicle 1. By means of the means for the autonomous navigation the cargo handling vehicle steer each of the ground engaging means 3 independently and align the cargo handling vehicle 1 in relation to the narrow aisle to the suitable travel angle. Further, each driving means is driven individually.

The invention claimed is:

1. A method in a cargo handling vehicle comprising autonomous navigation within a narrow aisle, a chassis having at least two pairs of ground engagers, and a lifting boom provided on the chassis extending in an extension direction of the chassis, the lifting boom having a first end and a second end wherein the first end is attached to the chassis and the second end is provided with a cargo attachment, wherein the autonomous navigation performs:
   receiving a request for handling a freight container within the narrow aisle, wherein the request comprises a freight container identification (ID), a size of the freight container, and a position of the freight container,
   determining that a width of the narrow aisle has a width that is less than a length of the chassis,
   based on the size of the freight container, the width of the narrow aisle, and a length of the cargo handling vehicle, wherein when the width of the narrow isle is determined to be less than the length of the cargo handling vehicle, determining a travel angle for the cargo handling vehicle within the narrow aisle,
   steering each of the at least two pairs of ground engagers by independently aligning the cargo handling vehicle in relation to the narrow aisle to the travel angle, and
   driving each of the at least two pairs of ground engagers individually.

2. The method according to claim 1, wherein the autonomous navigation further performs:
   based on the size of the freight container, the width of the narrow aisle, and the length of the cargo handling vehicle, determining a cargo attachment angle for the freight container within the narrow aisle.

3. The method according to claim 2, wherein the size of the freight container is any one of the length, width, height, and weight of the freight container.

4. The method according to claim 1, wherein the width of the narrow aisle is determined by a sensor arranged on the cargo handling vehicle.

5. The method according to claim 1, wherein the cargo handling vehicle is a variable-reach container handler.

6. A cargo handling vehicle for handling cargo within a narrow aisle comprising:
   autonomous navigation,
   a chassis having at least two pairs of ground engagers,
   a sensor that determines a width of the narrow aisle, and
   a lifting boom provided on the chassis extending in an extension direction of the chassis, the lifting boom having a first end and a second end wherein the first end is attached to the chassis and the second end is provided with a cargo attachment, wherein the first end of the lifting boom provides movement of the second end in vertical and horizontal directions, and the cargo attachment is arranged rotatably in a horizontal plane,
   each of the at least two pairs of ground engagers are independently steerable and are individually driven by a respective driver,
   determining, by the sensor, that the width of the narrow aisle is less than a length of the chassis of the cargo handling vehicle, and
   the autonomous navigation is arranged to determine a travel angle for the cargo handling vehicle based on the determined width of the narrow aisle being less than a length of the chassis of the cargo handling vehicle.

7. The cargo handling vehicle according to claim 6, wherein the cargo handling vehicle is a variable-reach container handler.

8. The cargo handling vehicle according to claim 6, wherein the cargo handling vehicle further comprises a manual handler and the autonomous navigation is arranged solely for use within narrow aisles.

9. The cargo handling vehicle according to claim 6, wherein the chassis has a rear end and a front end, the front end is provided with a front pair of the ground engagers and the rear end is provided with a rear pair of the ground engagers.

10. The cargo handling vehicle according to claim 6, wherein at least one pair of the at least two pairs of ground engagers is arranged adjustable along a length of the cargo handling vehicle such that a length of the wheel base can be altered.

11. The cargo handling vehicle according to claim 6, wherein the lifting boom is a telescopic lifting boom.

12. The cargo handling vehicle according to claim 6, wherein the first end of the lifting boom is arranged in connection to a rear end of the chassis.

13. The cargo handling vehicle according to claim 6, wherein the chassis is provided with a counter weight which is movable in a longitudinal direction of the chassis.

14. The cargo handling vehicle according to claim 6, wherein the cargo attachment is pivotable around three different axial directions.

15. The cargo handling vehicle according to claim 6, wherein a controller at least partially autonomously steers and drives the at least two pairs of ground engagers and the lifting boom is a telescopic lifting boom.

16. The cargo handling vehicle according to claim 6, wherein the driver is an electric motor that actuates in two directions.

17. The cargo handling vehicle according to claim 6, wherein each of the ground engagers is pivotable around a vertical axis.

18. The cargo handling vehicle according to claim 6, wherein the at least two pairs of ground engagers pivots ±90 degrees around a vertical axis.

19. The cargo handling vehicle according to claim 6, wherein the at least two pairs of ground engagers are wheels.

* * * * *